Jan. 19, 1926.  1,570,049

J. B. DILLARD

METHOD OF MAKING REAMERS

Filed June 15, 1925

INVENTOR.
James B. Dillard
BY
Fay, Oberlin & Fay
ATTORNEYS

Patented Jan. 19, 1926.

1,570,049

UNITED STATES PATENT OFFICE.

JAMES B. DILLARD, OF SHAKER HEIGHTS, OHIO, ASSIGNOR TO THE CLEVELAND TWIST DRILL COMPANY, OF CLEVELAND, OHIO, A CORPORATION OF OHIO.

METHOD OF MAKING REAMERS.

Application filed June 15, 1925. Serial No. 37,139.

*To all whom it may concern:*

Be it known that I, JAMES B. DILLARD, a citizen of the United States, and a resident of Shaker Heights, county of Cuyahoga, and State of Ohio, have invented a new and useful Improvement in Methods of Making Reamers, of which the following is a specification, the principle of the invention being herein explained and the best mode in which I have contemplated applying that principle, so as to distinguish it from other inventions.

The present improvements relate more particularly to a method for manufacturing spiral flute expansion reamers which differ from the ordinary spiral flute or helical reamer in that the body of the tool instead of being solid is cored out and slits are cut between the spiral flutes so as to permit of the expansion of the blades by forcing a pointed or tapered pin within the bore of the tool. Some difficulty has been encountered in the manufacture of this type of reamer due to the fact that the necessary slots between the blades cannot be readily cut to the required depth on a helix or spire inasmuch as a saw is conviently employed for this operation and if the twist of the helix be too great, such saw will either bind or break.

The object of the present invention, accordingly, is to provide a method wherein the slots in question may be cut straight and the spiral flutes subsequently milled in the usual manner as in the manufacture of solid spiral flute reamers.

To the accomplishment of the foregoing and related ends, the invention, then, consists of the steps hereinafter fully described and particularly pointed out in the claims; the annexed drawing and the following description setting forth in detail one approved method of carrying out the invention, such disclosed mode, however, constituting but one of the various ways in which the principle of the invention may be used.

In said annexed drawing:—

Figure 1:
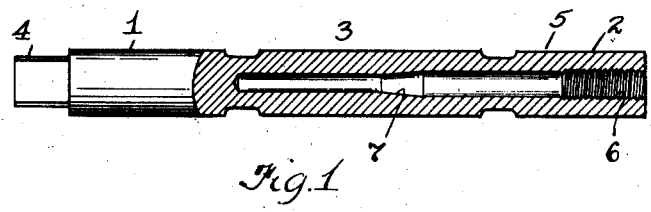
Figure 2:
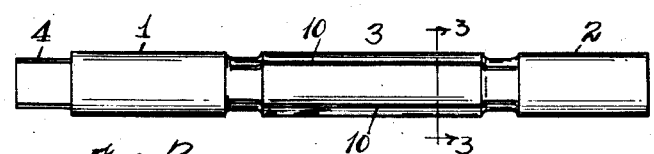
Figure 3:
Figure 4:
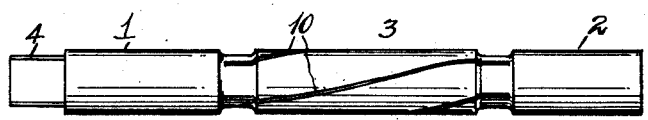
Figure 5:
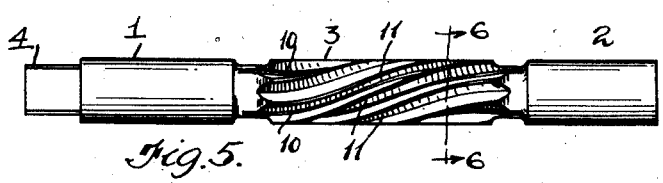

Fig. 1 is partly an axial section and partly a side elevation of a blank or piece of stock such as is employed in making a reamer according to the present improved method; Fig. 2 is a side elevation of such blank after the first operation thereof; Fig. 3 is a transverse section of such blank after such operation, the plane of the section being indicated by the line 3—3, Fig. 2; Fig. 4 is a similar side elevation of the blank after a second step has been performed thereon; Fig. 5 is a side elevation of the finished reamer; and Fig. 6 is a transverse section thereof, the plane of the section being indicated by the line 6—6, Fig. 5.

Figure 6:

As illustrated in Figs. 5 and 6, which show the finished article, the latter comprises two end portions 1 and 2 and an intermediate, spirally fluted body portion 3. One such end portion is left solid and is provided with a squared projection 4 whereby the reamer may be secured in a suitable chuck, while extending from the other end 2 through the body 3 of the reamer is a central bore 5, the preferred shape of which is for convenience illustrated in Fig. 1, although this bore will not necessarily be formed in the blank at this stage in the manufacture of the reamer; in other words, such blank, as presently will be described, will be solid until one or more of the operations now to be described has been performed thereon.

The outer portion 6 of the bore 5 is internally threaded and its diameter is reduced at an intermediate point 7 so that by means of a pin (not shown), provided with external threads to engage such thread 6 and with a pointed or tapered end to engage such reduced portion 7 of the bore, the body of the reamer may be expanded as required in use.

The first step in the manufacture of the reamer starting with the blank as shown in Fig. 1, but ignoring the bore 5 which may or may not be initially present, is to cut the desired number of slots 10 in the body portion of the reamer, four such slots being illustrated in Figs. 2 and 3. These slots, as previously stated, are cut with a saw and since they are straight and lie longitudinally of the reamer body, they may be very quickly and easily made. If the bore 5 is formed in the blank, they may be cut through into such bore or to a corresponding depth in the solid blank, or they may be cut through until they meet in the case of such solid blank.

The next step is to twist the body of the reamer so as to impart the desired spiral angle to the slots or, in other words, cause them to conform to the curve about such body which the flutes follow in the case of the finished article. The reamer, or at least the body portion thereof, will be heated preliminarily to such twisting operation and particularly where the slots are cut through to the previously formed bore, temporary filler strips corresponding to the metal removed by the saw will be inserted in the slots in order to prevent them from becoming closed incidentally to the twisting operation. The latter, it will be understood, is performed by gripping the respective ends 1 and 2 between jaw members capable of relative rotative movement.

After the reamer body has been thus twisted to impart the prescribed degree of spiral to the slots, the flutes 11 are next provided, being formed by milling away the metal on one side of each of the slots 10 and following more or less closely the angle of curvature of the latter. Inasmuch as there will ordinarily be more flutes than slots, such additional flutes as may be desired will be milled in the same manner between each pair of adjacent slots. The filler strips will ordinarily, although not necessarily, be removed before the milling operation and after the latter is completed, the body of the tool will be hardened in the usual manner.

As previously indicated, the central bore 5, which receives the expanding pin in the completely assembled article, may be drilled either in the original blank, as shown in Fig. 1, or following any subsequent step in the operation as described above, except of course after the article has been finally hardened. Accordingly, in referring to the reamer body, this term will be understood to connote such body whether solid or thus formed with a bore previous to the particular stage in the operation under consideration.

The milling of the spiral flutes may be performed with the same kind of cutter and in the same type of machine as are employed in making ordinary solid spiral flute reamers. The milling of these flutes being thus left as the final mechanical operation to be performed on the reamer, there is no such tendency to distort the blades as in the case where the blades as well as the slots are initially cut straight, i. e. before the twisting operation. The fact that the slots may be somewhat distorted incidentally to such twisting operation is of no particular consequence, but if an accurate tool is desired, the blades must of course conform accurately to gauge dimensions throughout their length.

The particular manner in which the twisting of the reamer body is accomplished is of course a matter of indifference. Thus, instead of gripping the opposite ends of the reamer, as above described, one such end may be gripped and a mandrel inserted in the central bore where this has been drilled previously to such twisting operation, and by then rotating such mandrel, the desired twist may be imparted to the reamer body. As one specific illustration of the procedure which may be followed in carrying out the present improved process, the slots in the reamer blank may be cut straight, such blank then twisted, the spiral flutes milled, and the hole for the expansion pin finally drilled; while as another example, after sawing the straight slots, the hole for the expansion pin may be next drilled, a mandrel then inserted and the reamer body twisted, and finally the spiral flutes milled in such body.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of making a spiral flute expansion reamer, the steps which consist in providing longitudinally extending radial slots in the reamer body, twisting said body to impart the desired spiral angle to such slots, and subsequently providing corresponding spiral flutes.

2. In a method of making a spiral flute expansion reamer, the steps which consist in providing longitudinally extending radial slots in the reamer body, placing temporary filler strips in such slots, heating the reamer body, twisting said body to impart the desired spiral angle to such slots, and subsequently providing corresponding spiral flutes.

3. In a method of making a spiral flute expansion reamer, the steps which consist in providing longitudinally extending radial slots in the reamer body, twisting said body to impart the desired spiral angle to such slots, and subsequently milling away the metal on the one side of each slot to form corresponding spiral flutes.

4. In a method of making a spiral flute expansion reamer, the steps which consist in sawing radial slots in the reamer body substantially parallel with its axis and circumferentially spaced thereabout, twisting said body to impart the desired spiral angle to such slots, and subsequently cutting corresponding spiral flutes.

5. In a method of making a spiral flute expansion reamer, the steps which consist in sawing radial slots in the reamer body substantially parallel with its axis and circumferentially spaced thereabout, twisting said body to impart the desired spiral angle to such slots, and subsequently milling away the metal on the one side of each slot to form corresponding spiral flutes.

Signed by me this 12th day of June, 1925.

JAMES B. DILLARD.